United States Patent
Crosley

(10) Patent No.: US 9,264,418 B1
(45) Date of Patent: Feb. 16, 2016

(54) CLIENT-SIDE SPAM DETECTION AND PREVENTION

(71) Applicant: Amazon Technologies, Inc., Reno, NV (US)

(72) Inventor: Jay Austin Crosley, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/185,796

(22) Filed: Feb. 20, 2014

(51) Int. Cl.
*H04L 29/06* (2006.01)
*H04L 12/58* (2006.01)

(52) U.S. Cl.
CPC ............. *H04L 63/08* (2013.01); *H04L 51/12* (2013.01)

(58) Field of Classification Search
None
See application file for complete search history.

(56) References Cited

U.S. PATENT DOCUMENTS

| | | | | |
|---|---|---|---|---|
| 7,693,945 B1* | 4/2010 | Dulitz | ..................... | H04L 51/12 709/206 |
| 7,890,627 B1* | 2/2011 | Thomas | ............... | G06Q 10/107 709/206 |
| 8,549,611 B2* | 10/2013 | Judge | ..................... | H04L 12/585 726/13 |
| 8,769,684 B2* | 7/2014 | Stolfo | ..................... | G06F 21/55 709/224 |
| 2004/0073617 A1* | 4/2004 | Milliken | ............... | G06F 21/562 709/206 |
| 2004/0148356 A1* | 7/2004 | Bishop et al. | ................. | 709/206 |
| 2005/0097179 A1* | 5/2005 | Orme | ............................. | 709/207 |
| 2005/0262209 A1* | 11/2005 | Yu | ................................ | 709/206 |
| 2006/0010215 A1* | 1/2006 | Clegg et al. | .................... | 709/206 |
| 2006/0059238 A1* | 3/2006 | Slater et al. | .................... | 709/206 |
| 2006/0212931 A1* | 9/2006 | Shull et al. | ....................... | 726/10 |
| 2007/0079379 A1* | 4/2007 | Sprosts et al. | .................. | 726/24 |
| 2007/0083929 A1* | 4/2007 | Sprosts et al. | .................. | 726/22 |
| 2007/0294352 A1* | 12/2007 | Shraim et al. | ................. | 709/206 |
| 2008/0059589 A1* | 3/2008 | Regnier | ................. | H04L 51/12 709/206 |
| 2013/0247192 A1* | 9/2013 | Krasser | ............... | H04L 63/1425 726/23 |

OTHER PUBLICATIONS

Bacchelli, Alberto; Dal Sasso, Tommaso; D'Ambros, Marco; Lanza, Michele. Content Classification of Development Emails. 2012 34th International Conference on Software Engineering (ICSE). Relevant pp. 375-385. http://ieeexplore.ieee.org/stamp/stamp.jsp?tp=&arnumber=6227177.*

Issac, Biju; Raman, Valliappan. Spam Detection Proposal in Regular and Text-based Image Emails. 2006 IEEE Region 10 Conference. TENCON 2006. Relevant pp. 1-4. http://ieeexplore.ieee.org/stamp/stamp.jsp?tp=&arnumber=4142536.*

* cited by examiner

*Primary Examiner* — Jeremiah Avery

(74) *Attorney, Agent, or Firm* — Kilpatrick Townsend & Stockton LLP

(57) ABSTRACT

Systems and methods for detecting and preventing spam content attempted to be sent from a sender account may be provided. In an embodiment, a system can determine if a user's electronic service has been compromised based on analyzing electronic messages attempted to be sent by the electronic service. For example, the system can calculate a score for the electronic messages utilizing a spam detection algorithm where the score represents the probability that the message contains spam content. The system can prevent the communication of electronic messages upon a determination that the electronic service has been compromised. The system can request authentication information from the user before further communication is allowed from the compromised electronic service.

20 Claims, 9 Drawing Sheets

CLIENT-SIDE SPAM DETECTION AND PREVENTION

BACKGROUND

Today, communicating with individuals all over the world has never been easier. Networking technology has allowed people to communicate with one another through email, instant messaging, or various social networking sites. However, despite the many advantages this technology has granted to individuals, security and other concerns remain. With the current free flow of electronic information, people are more likely to divulge and share their personal information including bank account information or social security information. Malicious programs or outside parties may utilize a variety of methods to attempt to gain access to an individual's information that is stored or communicated electronically. Once an individual's information has been compromised, the potential security threat can harm the individual and/or others by proliferating messages or content which are unwanted or harmful. Spam content can not only be annoying to the recipients but can also be cause for concern, as the recipients may be anxious about their own information security status.

BRIEF DESCRIPTION OF THE DRAWINGS

Various embodiments in accordance with the present disclosure will be described with reference to the drawings, in which.

DETAILED DESCRIPTION

Figure 1:
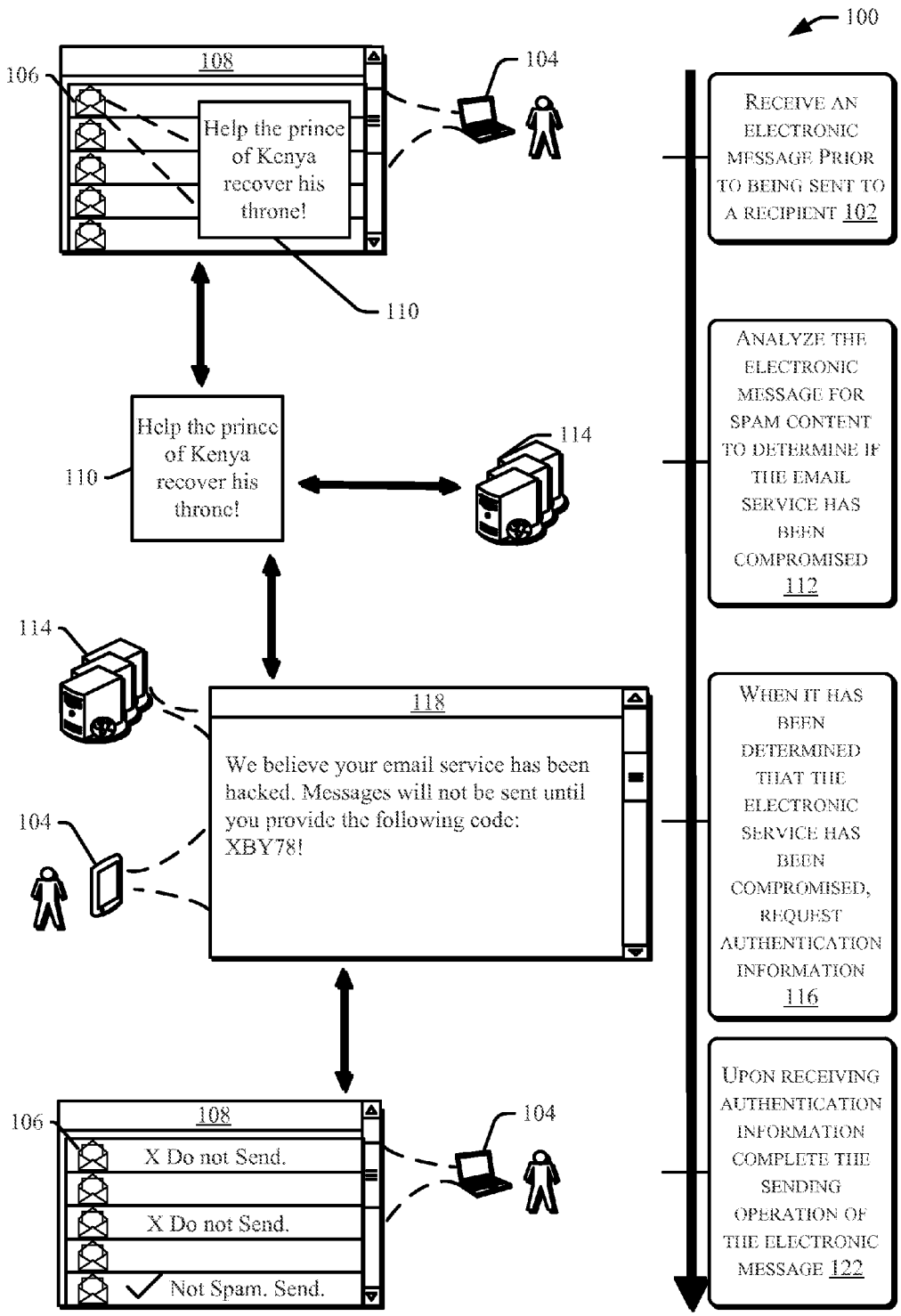
FIG. 1 illustrates an illustrative flow for providing a spam detection and prevention feature described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for detecting and preventing communication of spam content from the perspective of the client. In particular, the system can detect that an individual's electronic service has been compromised by an outside party and prevent further communication of messages from the electronic service until further security steps are taken. For example, an electronic message of a participating user (e.g., a user who is participating in the spam detection and prevention service) may be analyzed prior to sending the electronic message in order to detect whether the message contains spam content. Additionally, other messages being sent within a given time window of the electronic message may be analyzed to detect spam content. In accordance with at least one embodiment, a service may determine based on the analysis of the first electronic message and one or more temporally associated electronic messages that the electronic service associated with the messages has been infiltrated by an outside party. Upon the determination that the user's electronic service has been compromised the service may prevent the communication of messages until the user is authenticated. In accordance with at least one embodiment, once the user is authenticated, the service may allow the communication of the messages. As used herein, the phrase "compromised by an outside party" may refer to a situation involving a third-party gaining access to a user's electronic service or messaging service with malicious intent including the proliferation of spam and the gathering of sensitive user information.

In a non-limiting example, a participating user's email account may be compromised by an outside party (e.g., by a virus or an entity other than the user). The user's email account may attempt to send a plurality of email's which potentially contain spam content to people in the user's email address book. Prior to sending any of the suspect emails, the service may analyze the content of the emails to assign a score to the emails. The score may represent the probability that the emails contain spam content or are otherwise not authorized by the user. The same process may be performed on all or a subset of the emails being sent within a certain time window. The service may determine based at least on the scores assigned to the emails that the user's email account is compromised. Upon a determination that the user's email account is compromised (e.g., a single score above a threshold or a combination of scores above a threshold), the service may not transmit the messages until the user has successfully authenticated with the service. For example, the service may send a short text message to the user indicating that their email account appears to be compromised. The user may need to provide a unique code included in the text message before any further communication from the email account may be allowed. In an embodiment, upon user authentication, the service may hold the emails until the user has verified which emails should be sent and which emails should be marked as spam and/or deleted.

In accordance with at least one embodiment, a user's electronic service or messaging service can include an emailing service, a social networking service, an instant messaging service, or any suitable communication service that utilizes computer network technology. As described herein, the phrase "spam content" includes content which is irrelevant, contains inappropriate messages, contains computer viruses, contains links to other web sites which proliferate spam, contains unsolicited advertisements, or is any message not authorized or otherwise intended to be sent by the user. In an example, the content of a user's message, which is either being sent or attempting to be sent, may be analyzed for spam content utilizing a spam detection algorithm. Examples of a spam detection algorithm can include a Bayesian spam filtering algorithm, an AdaBoost machine learning algorithm, or any suitable combination of supervised learning spam classification algorithms. In an example, a spam detection algorithm may be utilized to determine whether the content of the electronic message contains spam content. For example, an algorithm may be utilized to determine if an email contains a nonsensical alpha numeric string in the body of an email, or contains multiple links to web pages that are known to proliferate viruses. In accordance with at least one embodiment, an electronic message can include an email, a social networking post or message, or an instant message. In accordance with at least one embodiment, electronic messages that are configured to be sent by a user or electronic messages that are attempting to be sent by a messaging service may be analyzed to determine if the messaging service has been compromised. In an embodiment, electronic messages that are configured to be sent or electronic messages that are attempting to be sent by a messaging service include messages that are formatted appropriately under Post Office Protocol (POP), Internet Message Access Protocol (IMAP), User Datagram Protocol (UDP), Transmission Control Protocol (TCP/IP), or Simple Mail Transfer Protocol (SMTP). In accordance with at least one embodiment, electronic messages that are configured to be sent or electronic messages that are attempting to be sent by a messaging service include messages that are composed by a user but not yet sent, messages that a user has attempted to send via the messaging service (through the use of a send button for example) but that have not been sent to their intended recipient by the messaging service, or messages that have not been forwarded to the recipient of the message by the messaging service. In accordance with at least one embodiment, electronic messages that are attempting to be sent by a messaging service may be identified and/or analyzed to determine that the messaging service has been compromised by a third party. In an embodiment, identifying that a messaging service is attempting to send a plurality of electronic messages or an electronic message includes identifying that electronic messages have been composed but not yet sent. In accordance with at least one embodiment, identifying that a messaging service is attempting to send a plurality of electronic messages or an electronic message includes identifying that the messages are configured in such a way that the message service may send them when ready.

In an embodiment, the analyzed electronic message(s) may be assigned a score which represents the probability that the message contains spam content. In accordance with at least one embodiment, the one or more scores may be compared to a certain threshold to determine if a user's electronic service has been compromised. In one embodiment, the threshold can be pre-defined by administrators of the service. In accordance with at least one embodiment, the threshold can be specified by a participating user. In one example, if the calculated score exceeds the threshold than the service may prevent communications from the electronic service. If the threshold is not exceeded, the service may allow communication from the electronic service to continue. In accordance with at least one embodiment, the threshold can be dynamically updated by the service according to training data provided by the user, the calculated scores, or any combination thereof. In accordance with at least one embodiment, the threshold can be determined based at least on whether the electronic service or service has previously been compromised by a third party.

In accordance with at least one embodiment, if an electronic service is prevented from communicating messages, the service may request authentication information from a user. In accordance with at least one embodiment, authentication information can include at least a username and password, a unique code or identifier communicated to the user via a mobile phone or other SMS texting technology, or a phone call. In accordance with at least one embodiment, upon receiving the requested authentication information from the user, communication from the electronic service may no longer be prevented. In accordance with at least one embodiment, the service may continue to prevent the communication of the electronic messages until the user has provided input on which particular messages should be communicated and which should not be communicated via a user interface.

In accordance with at least one embodiment, the service may detect that the electronic service of the user has been compromised by an outside party upon receiving one or more notifications from a social networking site. For example, one or more individuals associated with the user via the social networking site may notice that the user is communicating or posting content which appears to be spam. The individuals associated with the user may utilize a notification feature to flag the content as spam. In accordance with at least one embodiment, the user may utilize various notification features to indicate that the communicated content contains spam content. In an example, the notification features can include a flagging feature, a tag feature, or a response submit feature. In accordance with at least one embodiment, the notification features may be utilized by a user via a user interface provided by the messaging service or social networking service. In an embodiment, the flag feature, tag feature, and response submit feature can be utilized to indicate that the communicated content contains spam content and to notify the messaging service or social networking service associated with the user that the service may be compromised by a third party. For example, a recipient of the spam content may click a button on a user interface that can flag or tag the content as spam thus notifying the service provider that the messaging service or social networking service has been compromised. In another example, the recipient of the spam content may be able to select and submit the content as containing spam content by utilizing a user interface feature that allows for selection and submission of the content for further spam content analysis by the service or notification to the service regarding a possible compromise by a third party. In accordance with at least one embodiment, upon receiving a certain number of spam notifications, the electronic service associated with the user may be prevented from communicating any content until authentication information has been provided by the user as described herein.

In accordance with at least one embodiment, upon determining that an electronic service of the user has been compromised, the service may notify websites associated with the user to prevent reset authentication capabilities until authentication information has been provided by the user. For example, a user may normally use their email account to reset authentication for other services such as a bank account web page, or an electronic marketplace ordering web page. If the user's email account is compromised then an outside party may be able to reset the authentication with the associated services and gain access to said services. In accordance with at least one embodiment, the service may provide and/or utilize an API that notifies and allows the other services to prevent reset authentication capabilities. In accordance with at least one embodiment, once a user has provided authentication information to the service, the service may communicate with the associated services to allow reset authentication capabilities.

In accordance with at least one embodiment, a plurality of electronic messages that are attempting to be sent by a user's messaging service may be analyzed to determine if the messaging service has been compromised by a third party. In accordance with at least one embodiment, the determination of whether the messaging service has been compromised is based on analyzing a spam property of each electronic message or of the plurality of electronic messages. In an embodiment, the spam property or properties can include whether the electronic message contains spam content based on a spam detection algorithm, whether each electronic message of the plurality of electronic messages is attempting to be sent to a unique recipient within a time threshold or window, or whether the collective information of the electronic message containing spam content and each electronic message being sent to a unique recipient within a time window or threshold. For example, the system may identify that a user's electronic messaging service is attempting to send an electronic message to each person in the user's contact list within a short period of time or almost simultaneously. In response to identifying the attempted mass communication to each contact associated with the user within a short time window, the system may determine that the user's messaging service has been compromised by a third party and prevent communication of the electronic messages until the user has provided authentication information. In accordance with at least one embodiment, the system may identify that a message contains spam content and determine that the user's messaging service has been compromised by a third party and prevent communication of the electronic messages until the user has provided authentication information. In accordance with at least one embodiment, the system may calculate a score based on the spam properties which it may compare to a threshold to determine if the user's messaging service has been compromised.

FIG. 1 illustrates an illustrative flow for providing a spam detection and prevention feature described herein, according to at least one example. In one non-limiting example, the method 100 can receive an electronic message prior to being sent to a recipient at 102. For example, an outside party utilizing a user device 104 may be attempting to send electronic messages 106 via an electronic service 108 which contain spam content 110. The method 100 may analyze the electronic message for spam content to determine if the electronic service has been compromised 112. For example, a spam detection and prevention service provider computer 114 may analyze the spam content electronic message 110 utilizing a spam detection algorithm. The spam content electronic message 110 may contain a link to a web site which aids in distributing and proliferating viruses and other spam content. The spam detection algorithm may calculate a score for the electronic message 110 which represents the probability that the message contains spam content. The service provider computer 114 may then determine if the electronic service 108 has been compromised based on the score of the electronic message 110, other scores calculated from messages received within a particular time window surrounding the electronic message 110, and a specified threshold value.

When it has been determined by the service provider computer 114 that the electronic service 108 has been compromised, then the service provider computer 114 may request authentication information from the user 116 before communicating electronic messages 106. For example, the service provider computer 114 may request authentication information 118 from a user utilizing a user device 120. Once the user has provided the requested authentication information 118, the electronic messages 106 may be allowed to be communicated to their intended recipients 122. In accordance with at least one embodiment, the electronic service 108 may be prevented from communicating the electronic messages 106 until the user has successfully authenticated with the electronic service 108. The user utilizing a user device 104 may specify which electronic messages 106 can be communicated and which electronic messages were properly classified as containing spam content.

Figure 2:
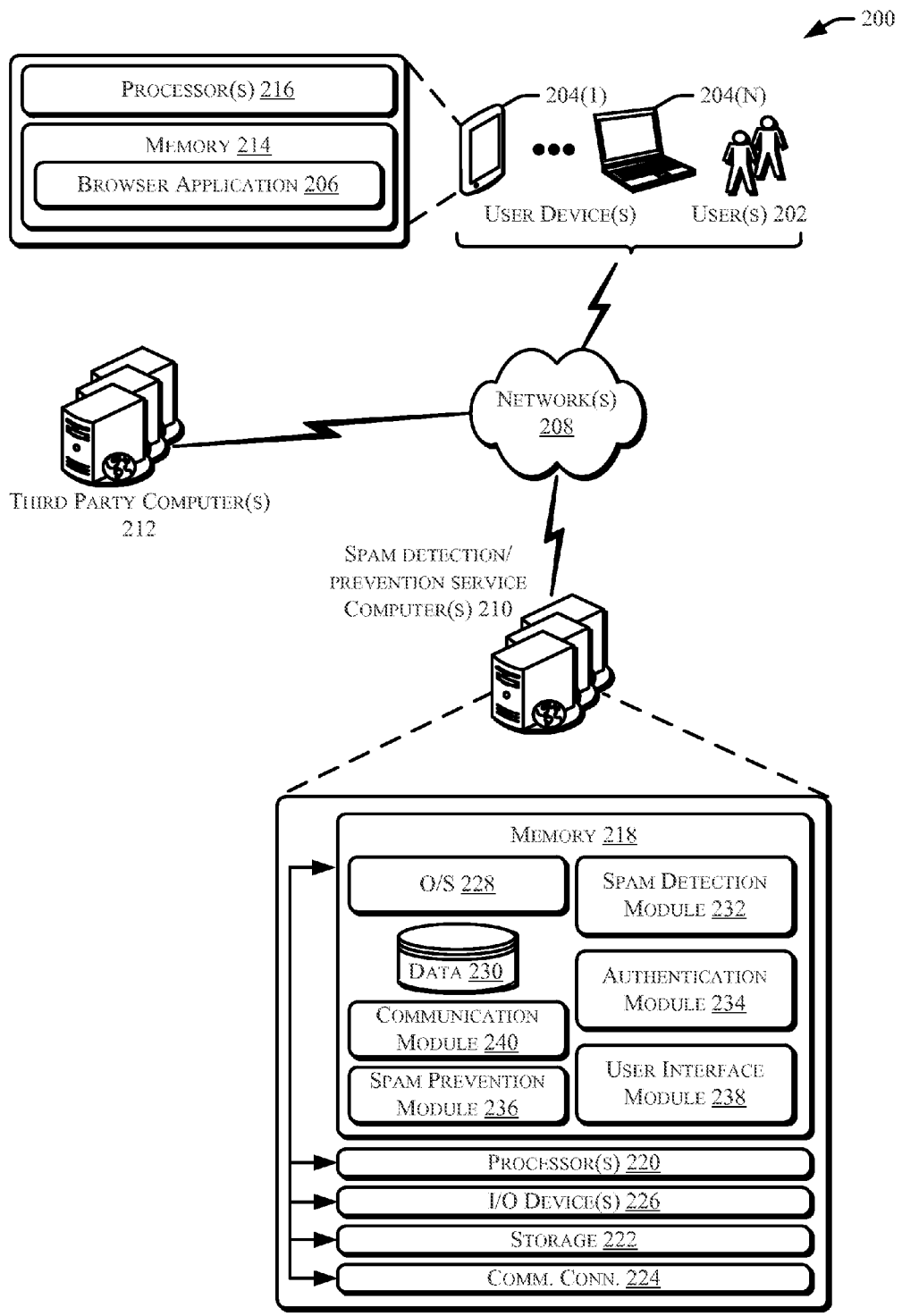
FIG. 2 illustrates an example architecture for spam detection and prevention feature described herein that includes one or more service provider computers and/or a user device connected via one or more networks, according to at least one example.

FIG. 2 illustrates an example architecture for spam detection and prevention from a sender perspective described herein that includes spam detection prevention service computer systems, one or more third party computers, and/or a user device connected via one or more networks, according to at least one example. In architecture 200, one or more users 202 (i.e., web service users) may utilize user computing devices 204(1)-(N) (collectively, user devices 204) to access an application 206 (e.g., a web browser), via one or more networks 208. In some aspects, the application 206 may be hosted, managed, and/or provided by a computing resources service or service provider, such as by utilizing one or more service provider computers and/or one or more spam detection/prevention service computers 210. The one or more spam detection/prevention service computers 210 may provide a native application which is configured to run on the user devices 204 which the user 202 may interact with to detect and prevent spam being sent from their associated electronic services. The one or more spam detection/prevention service computers 210 may, in some examples, provide computing resources such as, but not limited to, client entities, low latency data storage, durable data storage, data access, management, virtualization, cloud-based software solutions, electronic content performance management, etc. The one or more spam detection/prevention service computers 210 may also be operable to provide web hosting, computer application development, and/or implementation platforms, combinations of the foregoing, or the like to the one or more users 202. The one or more spam detection/prevention service computers 210, in some examples, may provide spam detection and prevention of electronic messages being sent from an electronic service associated with a user, determining whether the electronic service has been compromised by an outside party, and requesting authentication information from a user before sending operations may be completed. In some examples, the one or more spam detection/prevention service computers 210 may communicate with one or more third party computers 212 to provide services associated with spam detection and prevention.

In some examples, the networks 208 may include any one or a combination of many different types of networks, such as cable networks, the Internet, wireless networks, cellular networks and other private and/or public networks. While the illustrated example represents the users 202 accessing the application 206 over the networks 208, the described techniques may equally apply in instances where the users 202 interact with the spam detection/prevention computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 206 may allow the users 202 to interact with a service provider computer, such as to access web content (e.g., web pages, music, video, etc.). The one or more spam detection/prevention computers 210, perhaps arranged in a cluster of servers or as a server farm, may host the application 206 and/or cloud-based software services. Other server architectures may also be used to host the application 206. The application 206 may be capable of handling requests from many users 202 and serving, in response, various item web pages. The application 206 can provide any type of website that supports user interaction, including social networking sites, online retailers, informational sites, blog sites, search engine sites, news and entertainment sites, and so forth. As discussed above, the described techniques can similarly be implemented outside of the application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the spam detection/prevention computers 210 via the networks 208, or via other network connections. Additionally, the user devices 204 may be part of the distributed system managed by, controlled by, or otherwise part of the spam detection/prevention computers 210 (e.g., a console device integrated with the spam detection/prevention computers 210).

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein including at least a user provided input element or electronic service web page, such as via the browser application 206 or dedicated applications (e.g., smart phone applications, tablet applications, etc.). The browser application 206 may be configured to receive, store, and/or display a website or other interface for interacting with the spam detection/prevention computers 210. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

In some aspects, the question/answer management computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the spam detection/prevention computers 210 may be in communication with the user devices 204 and/or other service providers via the networks 208, or via other network connections. The spam detection/prevention computers 210 may include one or more servers, perhaps arranged in a cluster, as a server farm, or as individual servers not associated with one another. These servers may be configured to implement the spam detection/prevention services described herein as part of an integrated, distributed computing environment.

In one illustrative configuration, the spam detection/prevention computers 210 may include at least one memory 218 and one or more processing units (or processor(s)) 220. The processor(s) 220 may be implemented as appropriate in hardware, computer-executable instructions, firmware, or combinations thereof. Computer-executable instruction or firmware implementations of the processor(s) 220 may include computer-executable or machine-executable instructions written in any suitable programming language to perform the various functions described.

The memory 218 may store program instructions that are loadable and executable on the processor(s) 220, as well as data generated during the execution of these programs. Depending on the configuration and type of spam detection/prevention computers 210, the memory 218 may be volatile (such as RAM) and/or non-volatile (such as ROM, flash memory, etc.). The spam detection/prevention computers 210 or servers may also include additional storage 222, which may include removable storage and/or non-removable storage. The additional storage 222 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM, or ROM.

The memory 218, the additional storage 222, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 222 are all examples of computer storage media. Additional types of computer storage media that may be present in the spam detection/prevention computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the spam detection/prevention computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The spam detection/prevention computers 210 may also contain communications connection(s) 224 that allow the spam detection/prevention computers 210 to communicate with a stored database, another computing device or server, user terminals and/or other devices on the networks 208. The spam detection/prevention computers 210 may also include I/O device(s) 226, such as a keyboard, a mouse, a pen, a voice input device, a touch input device, a display, speakers, a printer, etc.

Turning to the contents of the memory 218 in more detail, the memory 218 may include an operating system 228, one or more data stores 230, and/or one or more application programs or services for implementing the features disclosed herein including a spam detection module 232, an authentication module 234, a spam prevention module 236, a user interface module 238, and/or a communication module 240. In some examples, the spam detection module 232 may be configured to detect whether electronic messages contain spam content. For example, the spam detection module 232 can be configured to utilize one or more spam detection algorithms to determine the probability that an electronic message(s) contain spam content. In an embodiment, this process may include calculating a score for the electronic message where the score represents the probability that the message contains spam content. In another example, the spam detection module 232 may be configured to determine whether a plurality of messages being sent within a given time window contain spam content. The spam detection module 232 may be configured to calculate a score for the plurality of messages sent within a given time window to aid in determining whether an electronic service associated with the message has been compromised by an outside party.

The spam detection module 232 may be configured to determine whether an electronic message contains spam content. For example, the spam detection module 232 can utilize a spam detection algorithm to determine whether an electronic message contains spam content. The spam detection module 232 may also be configured to determine whether a plurality of messages that are being sent within a certain time period of the electronic message also contain spam content. In accordance with at least one embodiment, the spam detection module 232 may calculate a first score for the electronic message which represents the probability that the electronic message contains spam content. In some examples, the first score may be utilized by the spam prevention module 236 to determine whether the electronic service associated with the electronic message has been compromised.

The spam detection module 232 may also be configured to calculate a history score which represents the probability that the plurality of messages being sent within a certain time period of the electronic message also contain spam content. In accordance with at least one embodiment, the spam detection module 232 may provide the first score and the history score to the spam prevention module 236 to determine whether the electronic service associated with the message has been compromised by an outside party. For example, the spam prevention module 236 may compare a combination of the scores to a specified threshold to determine whether the electronic service has been compromised by an outside party.

In accordance with at least one embodiment, the spam detection module 232 may be configured to receive a notification that an electronic message is being sent by an electronic service associated with a user. For example, an outside party may be utilizing the user's user device 204 to send messages which contain spam content. In an example, a virus may be attempting to send a plurality of messages to each contact within a user's email account. The messages may be communicated to the one or more spam detection/prevention service computers 210 via the networks 208 from a local electronic service, such as a local mail client, configured to run on the user device 204. In accordance with at least one embodiment, the spam detection/prevention service computers 210 may be configured to provide a native application for spam detection and prevention for use on the user device 204. In accordance with at least one embodiment, the electronic message may be communicated from an electronic service configured to run on the browser application 206 where the electronic service is provided by a third party. The third party may utilize one or more third party computers 212 to communicate the messages being sent from the electronic service to the spam detection prevention service computers 210 via networks 208. In accordance with at least one embodiment, the spam detection/prevention service computers 210 may be configured to provide electronic services for sending and receiving electronic messages such as an email client or social networking site. The spam detection/prevention service computers 210 may provide the electronic service via networks 208 to display and interact with on user devices 204 utilizing a browser application 206 or a native application configured to run on the user devices 204. In accordance with at least one embodiment, a user may opt-in to participate in the service provided by the spam detection/prevention service computers 210. In some examples, the user may participate in the spam detection/prevention services by agreeing to a user license agreement upon signing up for an electronic service such as an email client or social network. The user license agreement provided by a third party email client or social network may also include language which informs the user that they can participate in services provided by the spam detection/prevention service computers 210.

The spam detection module 232 may also be configured to receive one or more notifications from recipients of spam content from an electronic service associated with the user. In accordance with at least one embodiment, the communication module 240 in conjunction with the spam detection module 232 may be configured to receive the one or more notifications and calculate a probability that the electronic service associated with the user has been compromised by an outside party. For example, several people associated with the user via a social networking site may receive multiple messages which contain spam content. The several people may utilize a notification feature, which has been provided by the spam detection/prevention service computer 210 to the electronic service, to flag or tag received content as spam. In accordance with at least one embodiment, the notification feature may communicate the notifications from the electronic service to the spam detection/prevention service computers 210 via networks 208. In accordance with at least one embodiment, the spam prevention module 236 may be configured to analyze the notifications and calculate a probability that the electronic service has been compromised. For example, the number of notifications may be compared to a specified threshold by the spam prevention module 236 to determine if the electronic service has been compromised.

In accordance with at least one embodiment, the spam detection/prevention service computers 210 and the spam detection module 232 may be responsible for encrypting and decrypting electronic messages being sent by the user utilizing an electronic service configured to run on a browser application 206 or a native application on the user device 204. In accordance with at least one embodiment, messages may be encrypted for communication to the spam detection/prevention service computers 210, decrypted and analyzed by the spam detection module 232, and encrypted again for transfer to the electronic service attempting to send the message. In some examples, the spam detection prevention service computers 210 may employ encryption/decryption techniques including a symmetric key encryption scheme, a public key encryption scheme, or any suitable encryption/decryption algorithm or scheme.

The memory 218 may also include a spam prevention module 236. The spam prevention module 236 may be configured to determine if an electronic service has been compromised. As described herein and in accordance with at least one embodiment, the spam prevention module 236 can compare a score calculated by the spam detection module 232 to a specified threshold to determine if the electronic service of a user has been compromised. In accordance with at least one embodiment, a user may specify the threshold which determines if an electronic service has been compromised. In accordance with at least one embodiment, the user specified thresholds may be stored on the one or more data stores 230 for access and maintenance. In accordance with at least one embodiment, an administrator of the spam detection/prevention service computers 210 may specify the threshold. In accordance with at least one embodiment, different users may have different thresholds specified for them. In some examples, different electronic services associated with the user may have varying threshold values specified by either the user or an administrator of the spam detection/prevention computers 210.

In accordance with at least one embodiment, the spam prevention module 236 may be responsible for preventing the sending of electronic messages from an electronic service that has been determined to be compromised. For example, upon a determination by the spam prevention module 236 that a user's email account has been compromised, the spam prevention module 236 can prevent the communication of any outgoing emails from the email account until authentication information has been provided by the user. Thus, the outside party who has compromised the email account may be unable to send a message to any recipient until the user has provided the requested authentication information. As will be described below, the spam prevention module 236 may communicate with the authentication module 234 to request authentication information from the user to allow the sending of electronic messages.

In accordance with at least one embodiment, the spam prevention module 236 in combination with the communication module 240 may be responsible for preventing third party reset authentication capabilities upon a determination that the user's electronic service has been compromised. For example, a user's email account may be compromised by a third party. The compromising party, or outside party, may then be able to utilize the email account to reset the user's authentication for an associated bank account, electronic marketplace ordering account, a credit card account, or any third party service which contains financial information or personal information. In accordance with at least one embodiment, the spam detection/prevention service computers 210 may provide to participating third party services an API which allows the spam prevention module 236 to prevent reset authentication capabilities. In accordance with at least one embodiment, the spam prevention module 236 may invoke the API of a participating third party service to prevent reset authentication capabilities via networks 208 to, for example, one or more third party computers 212. In accordance with at least one embodiment, the third party services may provide their own preventative reset authentication functions or APIs which may be called or invoked by the spam prevention module 236 upon a determination that a user's electronic service has been compromised.

The memory 218 may also include authentication module 234. The authentication module 234 may be configured to request and receive authentication information from a user. For example, when a determination has been made that the user's electronic service has been compromised, the authentication module 234 may create a unique code to provide to the user via a means other than the compromised electronic service. In an example, the authentication module 234 may provide a unique code to the user via a SMS text message, a digital message to be played on a mobile phone, an email to an electronic service that has not been determined to be compromised, or via any suitable means of digital communication. In accordance with at least one embodiment, the authentication module 234 may be configured to request authentication information. Authentication information may include username and password information, an answer to a security question, a previously provided code, or a time sensitive code communicated to the user.

In accordance with at least one embodiment, the authentication information requested may include an authenticator token which can be provided by the spam detection/prevention service computers 210 via a separate standalone application. In accordance with at least one embodiment, the authentication module 234 and spam prevention module 236 may be configured to allow the sending of messages upon receiving the requested authentication information. In accordance with at least one embodiment, the one or more data stores 230 may be configured to store and maintain requested and received authentication information. In accordance with at least one embodiment, the authentication module 234 and the spam prevention module 236 may be configured to communicate with one or more third party services to allow reset authentication capabilities that may have been previously locked.

The memory 218 may also include user interface module 238. In accordance with at least one embodiment, the user interface module 238, the spam prevention module 236, and the spam detection module 232 may be configured to receive input from a user interface associated with the electronic service. In accordance with at least one embodiment, the user interface module 238 and the spam prevention module 236 may prevent the sending of messages from a compromised electronic service after receiving authentication information provided by the user. The modules 238 and 236 may require further input from the user regarding which messages should be sent and which were correctly classified as containing spam content. In some examples, the user interface module 238 and the spam prevention module 236 may allow the sending of user specified electronic messages upon receiving the user input. In an example, the user interface module may be configured to receive input regarding which messages should be sent and which should not be sent. For example, if a user's email account has been compromised, upon providing the requested authentication information, the user may securely log into the email account and specify which emails should be sent and which should not be sent. In accordance with at least one embodiment, the spam detection/prevention service computers 210 and the user interface module 238 may be responsible for providing a user interface which the user may interact with to provide input regarding electronic messages. In accordance with at least one embodiment, the user interface module 238 may provide a user interface to the user via the browser application 206 or via an application configured to run on the user device 204.

A few additional examples of the operations of the question/answer management computers 210 are also described in greater detail below with reference to FIGS. 3-8.

Figure 3:
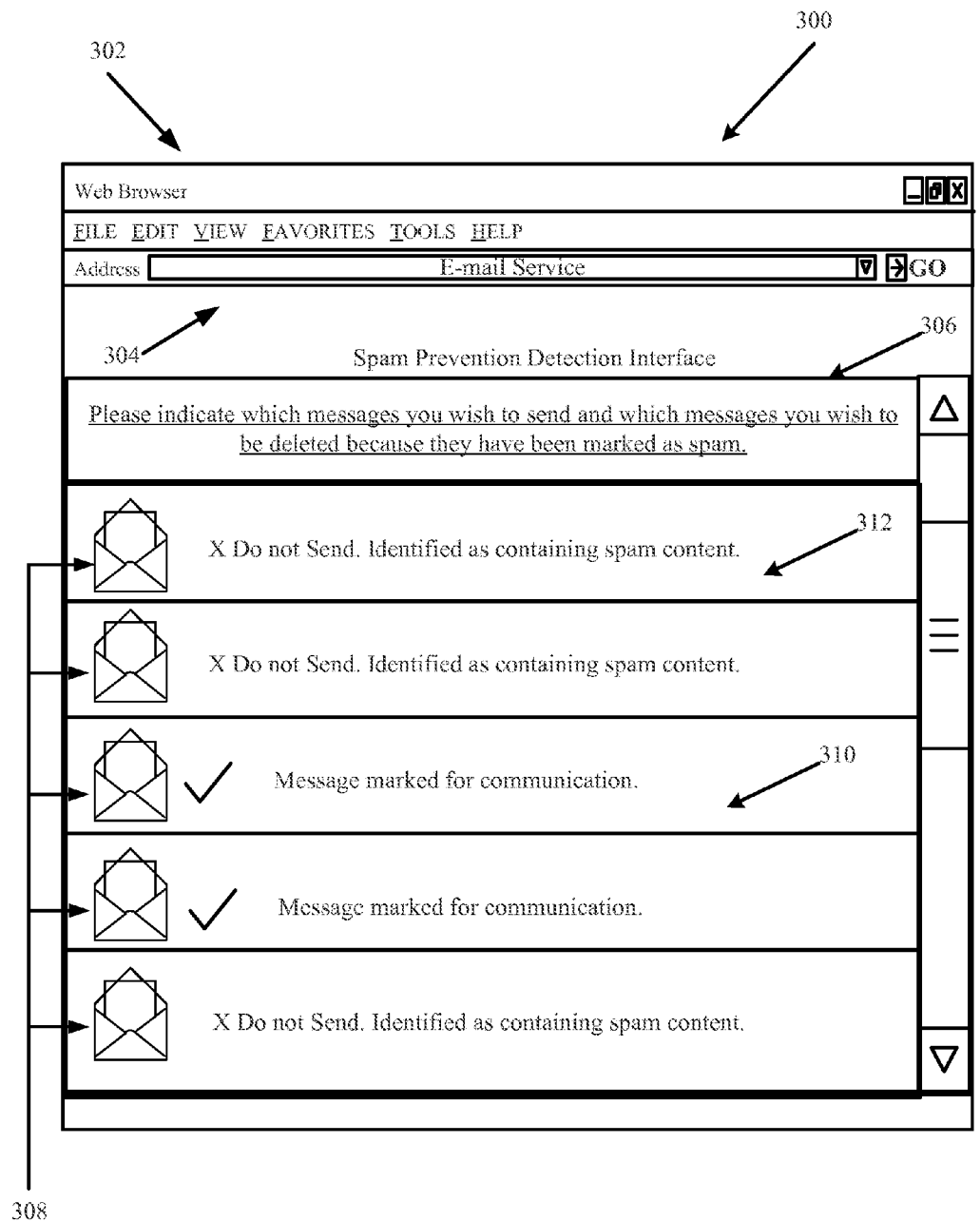
FIG. 3 illustrates an example user interface for marking emails for sending or not sending based on the whether the content has been identified as spam, according to at least one example.

FIG. 3 depicts a user interface diagram illustrating an example user specified electronic message confirmation web page in accordance with at least one embodiment. As shown, the illustrative web page 300 is displayed via a web-browser 302. It should be noted that while the user specified electronic message confirmation web page is discussed in this example as utilizing a web page interface, any user friendly GUI configured to run on a suitable computing device may also be utilizing including an application configured to run on the user device 204 or provided by the one or more service provider computers 210. The web page 300 may include an address bar 304 which a user may enter a uniform resource locator (URL) to be directed to a user specified electronic message confirmation web page associated with an electronic service such as an email account. The web page 300 may include an information box 306 which may provide instructions to the user on how to interact with the user specified electronic message confirmation web page.

The web page 300 may include a plurality of electronic messages 308 that are being prevented from being sent by the spam detection/prevention service described herein. As described above, the interface provided via web page 300 may be configured to receive input from the user indicating which messages should be sent 310 and which messages were correctly classified as spam content 312. In accordance with at least one embodiment, once the user has indicated that a message may be communicated, the modules 236 and 238 may allow the electronic service associated with the messages to complete the sending operation of the confirmed messages. In accordance with at least one embodiment, messages which are confirmed as containing spam content may be utilized by the spam detection/prevention computers 210 and spam detection module 232 to provide training data for the one or more spam detection algorithms described above. In accordance with at least one embodiment, the one or more spam detection algorithms may be dynamically updated utilizing the provided training data as confirmed by the user.

Figure 4:
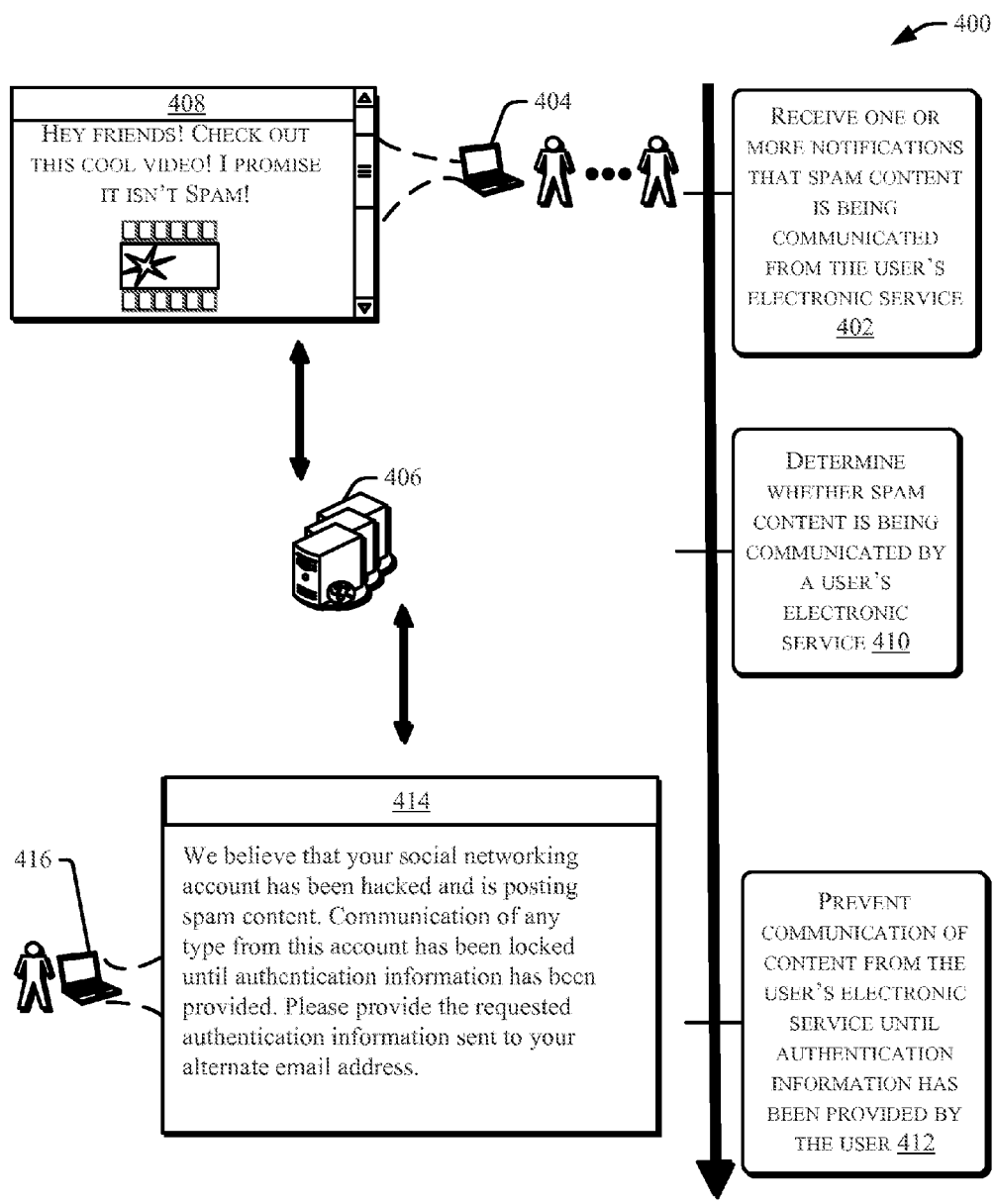
FIG. 4 illustrates an illustrative flow for providing a spam detection and prevention feature associated with a social network described herein, according to at least one example.

FIG. 4 illustrates an illustrative flow for providing a spam detection and prevention feature associated with a social network described herein, according to at least one example. In one non-limiting example, the method 400 can receive one or more notifications from an electronic service that spam content is being communicated from the user's electronic service at 402. For example, one or more recipients of the spam content 408 may notify the spam detection and prevention service computers 406 utilizing user devices 404. The method 400 may determine based on the one or more notifications if the electronic service has been compromised 410. For example, a spam detection and prevention service provider computer 406 may compare the number of received notifications to a specified threshold to determine if the user's electronic service has been compromised. As described above, the spam prevention module 236 and communication module 420 may be responsible for determining whether the user's electronic service has been compromised based at least in part on the one or more notifications.

When it has been determined by the service provider computer 406 that the user's electronic service has been compromised, then the service provider computer 406 may request authentication information from the user 412 before communicating electronic messages from the associated electronic service. For example, the service provider computer 406 may request authentication information 414 from a user utilizing a user device 416. Once the user has provided the requested authentication information 414, electronic messages may again be communicated from the associated electronic service. In accordance with at least one embodiment, the electronic service may be prevented from communicating the electronic messages until the user has successfully authenticated with the electronic service. The user utilizing a user device 404, 416 may specify which electronic messages can be communicated and which electronic messages were properly classified as containing spam content.

Figure 5:
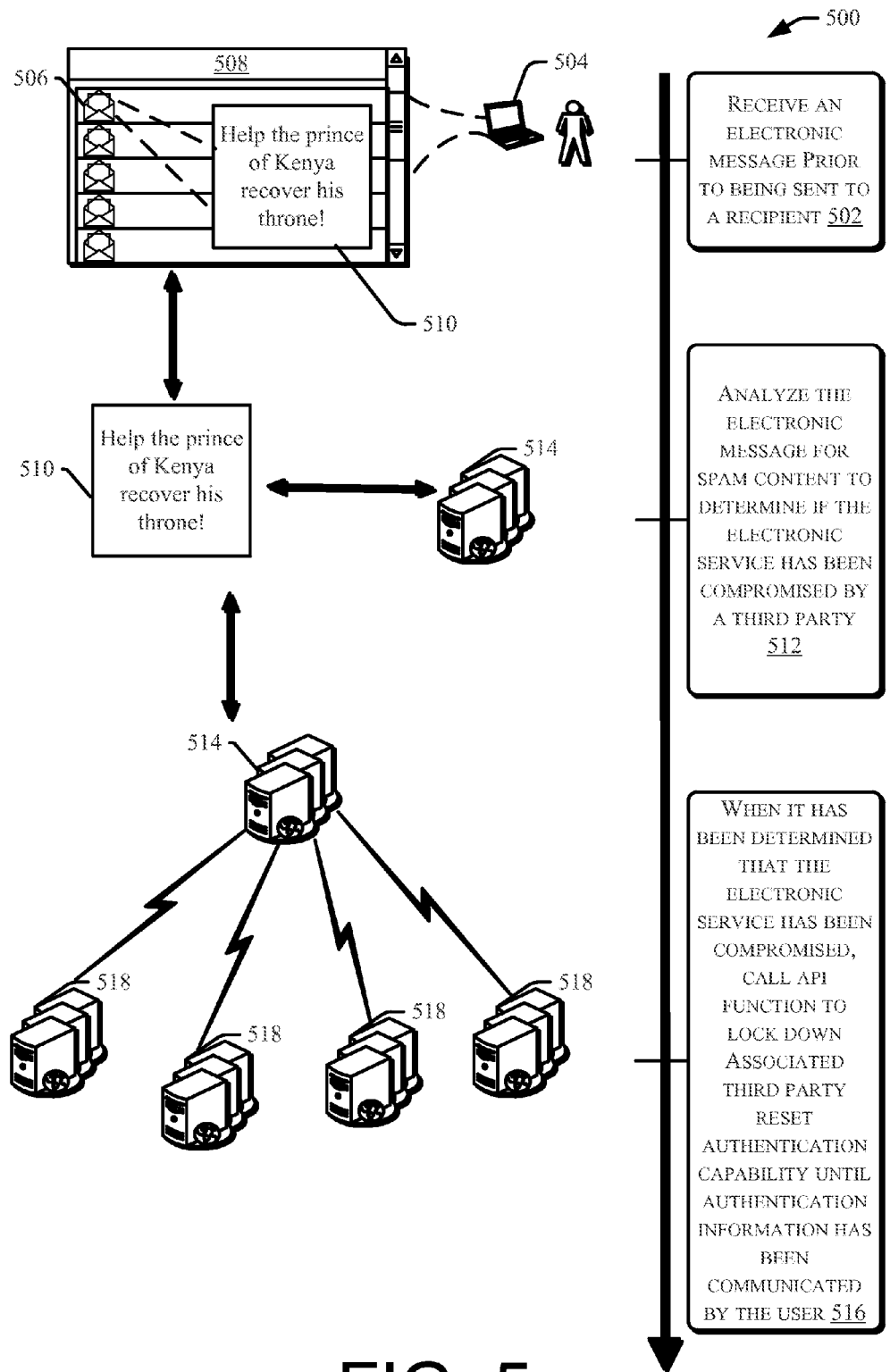
FIG. 5 illustrates an illustrative flow for a third party reset authentication prevention feature described herein, according to at least one example.

FIG. 5 illustrates an illustrative flow for a third party reset authentication prevention feature described herein, according to at least one example. In one non-limiting example, the method 500 can receive an electronic message prior to being sent to a recipient at 502. For example, an outside party utilizing a user device 504 may be attempting to send electronic messages 506 via an electronic service 508 which contain spam content 510. The method 500 may analyze the electronic message for spam content to determine if the electronic service has been compromised 512. For example, a spam detection and prevention service provider computer 514 may analyze the spam content electronic message 510 utilizing a spam detection algorithm. The spam content electronic message 510 may contain a link to a web site which aids in distributing and proliferating viruses and other spam content. The spam detection algorithm may calculate a score for the electronic message 510 which represents the probability that the message contains spam content. The service provider computer 514 may then determine if the electronic service 508 has been compromised based on the score of the electronic message 510, other scores calculated from messages received within a particular time window surrounding the electronic message 510, and a specified threshold value. In accordance with at least one embodiment, the service provider computer 514 may determine if the electronic service 508 has been compromised based on any combination of the score of the electronic message 510, other scores calculated from messages received within a particular time window surrounding the electronic message 510, or a specified threshold value.

When it has been determined by the service provider computer 514 that the user's electronic service has been compromised, then the service provider computer 514 may call APIs to prevent reset authentication capability of associated third party services until authentication information has been provided by the user 516. For example, the service provider computer 514 may call or invoke APIs provided by the one or more associated third party services 518 to prevent reset authentication capability. In accordance with at least one embodiment, the API may be provided to the associated third party services by the spam detection/prevention service via networks 208. Once the user has provided the requested authentication information the service provider computer 514 may communicate with the associated third party services 518 to again allow reset authentication capability. In accordance with at least one embodiment, the renewal of reset authentication capability may be provided by a different or a similar API call as utilized at 516.

Figure 6:
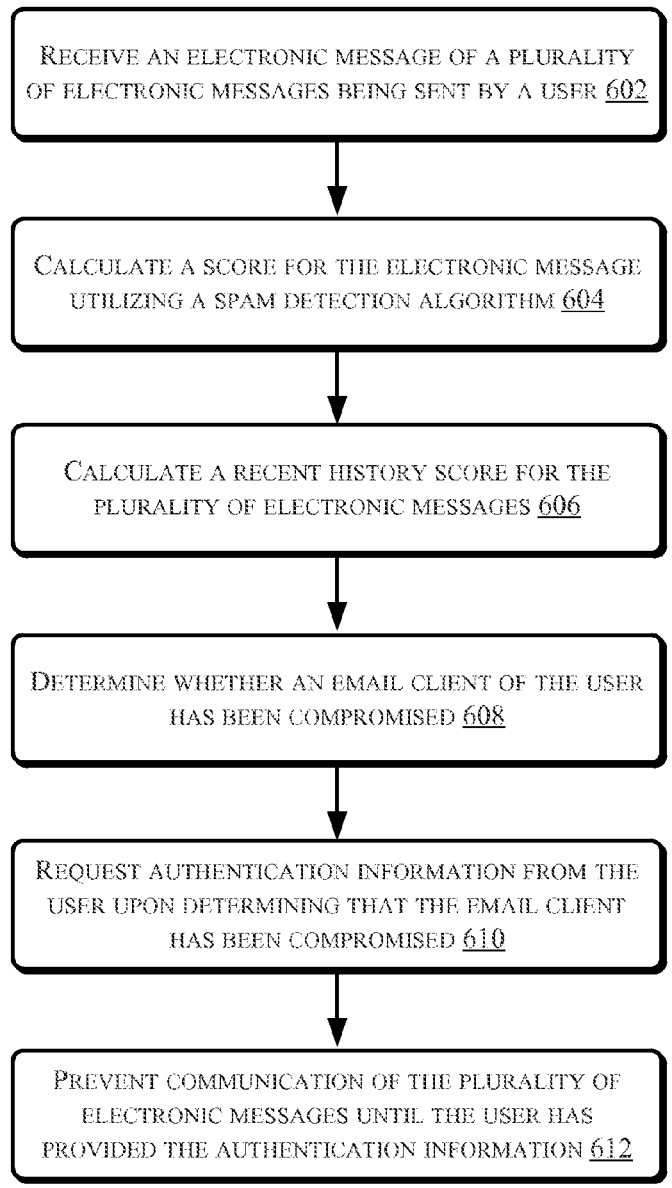
FIG. 6 illustrates an example flow diagram of a process for describing an implementation of a spam detection and prevention system described herein, according to at least one example.
Figure 7:
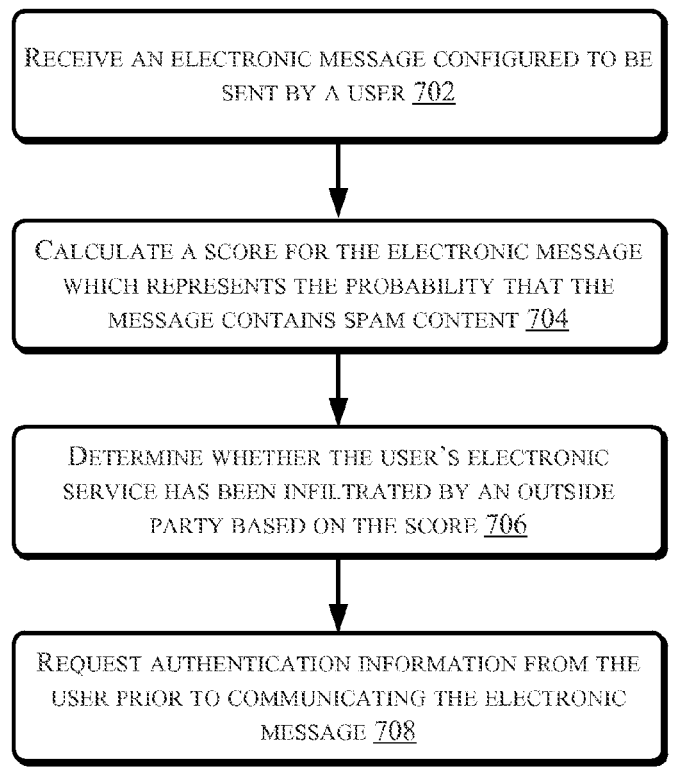
FIG. 7 illustrates an example flow diagram of a process for describing an implementation of a spam detection and prevention system described herein, according to at least one example.
Figure 8:
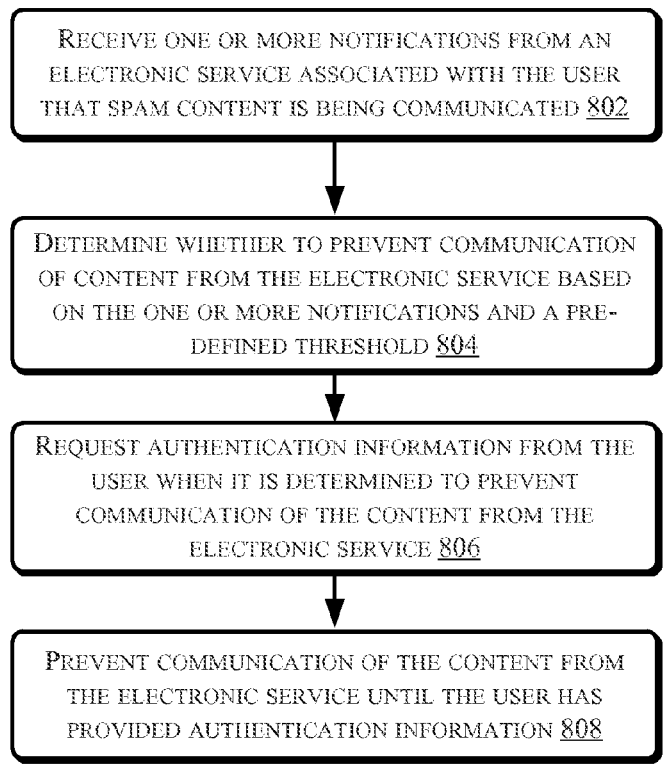
FIG. 8 illustrates an example flow diagram of a process for describing an implementation of a spam detection and prevention system described herein, according to at least one example.

FIGS. 6-8 illustrate example flow diagrams showing respective processes 600, 700, and 800 for spam detection and prevention from a sender perspective, according to at least a few examples. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

FIG. 6 illustrates an example flow diagram of a process for describing an implementation of a spam detection and prevention system described herein, according to at least one example. In some examples, the one or more spam detection/prevention service computers 210 (e.g., utilizing at least one of the spam detection module 232, the authentication module 234, the spam prevention module 236, the user interface module 238, the communication module 240, and the one or more data stores 230) shown in FIG. 2 may perform the process 600 of FIG. 6. The process 600 may begin at 602 by receiving an electronic message of a plurality of electronic messages being sent by a user. In an embodiment, the electronic messages may include an email, an instant message, or an electronic message associated with a social networking site. At 604, the process 600 may include calculating a score for the electronic message utilizing a spam detection algorithm. In an embodiment, the score represents the probability that the electronic message contains spam content.

At 606 the process 600 may include calculating a recent history score for the plurality of electronic messages. In an embodiment, the recent history score can be calculated utilizing the spam detection algorithm described above. In some examples, the recent history score can be a combination of scores for each individual message. In accordance with at least one embodiment, a recent history score can be calculated based at least in part on how many individual messages are being sent within a given time window surrounding the electronic message. In accordance with at least one embodiment, the time window may be specified by the user, the service provider, or the messaging service. At 608 the process 600 may include determining whether an email client of the user has been compromised by an outside party based at least in part on the score and the recent history score. At 610 the process 600 may include requesting authentication information from the user upon a determination that the email client has been compromised by an outside party. In an embodiment, the authentication information may be requested from a user via a text message, an email message sent to an alternate email client, or a digital recording that may interact with any suitable media player. The process 600 may conclude at 612 by preventing the communication of the plurality of electronic messages until the user has provided the authentication information 612. In some examples, the user may provide the authentication information utilizing user devices 204.

FIG. 7 illustrates an example flow diagram of a process for describing an implementation of a spam detection and prevention system described herein, according to at least one example. In some examples, the one or more spam detection/prevention service computers 210 (e.g., utilizing at least one of the spam detection module 232, the authentication module 234, the spam prevention module 236, the user interface module 238, the communication module 240, and the one or more data stores 230) shown in FIG. 2 may perform the process 700 of FIG. 7. The process 700 may begin at 702 by receiving an electronic message being sent by a user. In an embodiment, the electronic messages may include an email, an instant message, or an electronic message associated with a social networking site. At 704, the process 700 may include calculating a score for the electronic message. In an embodiment, the score represents the probability that the electronic message contains spam content. In accordance with at least one embodiment, the score may be calculated utilizing one or more spam detection algorithms.

At 706 the process 700 may include determining whether an electronic service of the user has been infiltrated by an outside party based at least in part on the score. The process 700 may conclude at 708 by requesting authentication information from the user upon a determination that the electronic service has been compromised. In an embodiment, the authentication information may be requested from a user via a text message, an email message sent to an alternate email client, or a digital recording that may interact with any suitable media player. In some examples, the user may provide the authentication information utilizing user devices 204.

FIG. 8 illustrates an example flow diagram of a process for describing an implementation of a spam detection and prevention system described herein, according to at least one example. In some examples, the one or more spam detection/prevention service computers 210 (e.g., utilizing at least one of the spam detection module 232, the authentication module 234, the spam prevention module 236, the user interface module 238, the communication module 240, and the one or more data stores 230) shown in FIG. 2 may perform the process 800 of FIG. 8. The process 800 may begin at 802 by receiving one or more notifications from an electronic service associated with the user that span content is being communicated. In an embodiment, the notifications can be in response to a social network associated with the user communicating electronic messages which contain spam, or in response to an email client associated with the user communicating emails which contain spam content. At 804, the process 800 may include determining whether to prevent communication of content from the electronic service based at least in part on the one or more notifications and a pre-defied threshold. In an embodiment, the pre-defined threshold may be specified by the user or by an administrator of the spam detection/prevention service computers 210.

At 806 the process 800 may include requesting authentication information from the user upon a determination to prevent communication of content from the electronic service. In an embodiment, the authentication information may be requested from a user via a text message, an email message sent to an alternate email client, or a digital recording that may interact with any suitable media player. In some examples, the user may provide the authentication information utilizing user devices 204. The process 800 may conclude at 808 by preventing the communication of content from the electronic service until the user has provided authentication information.

Figure 9:
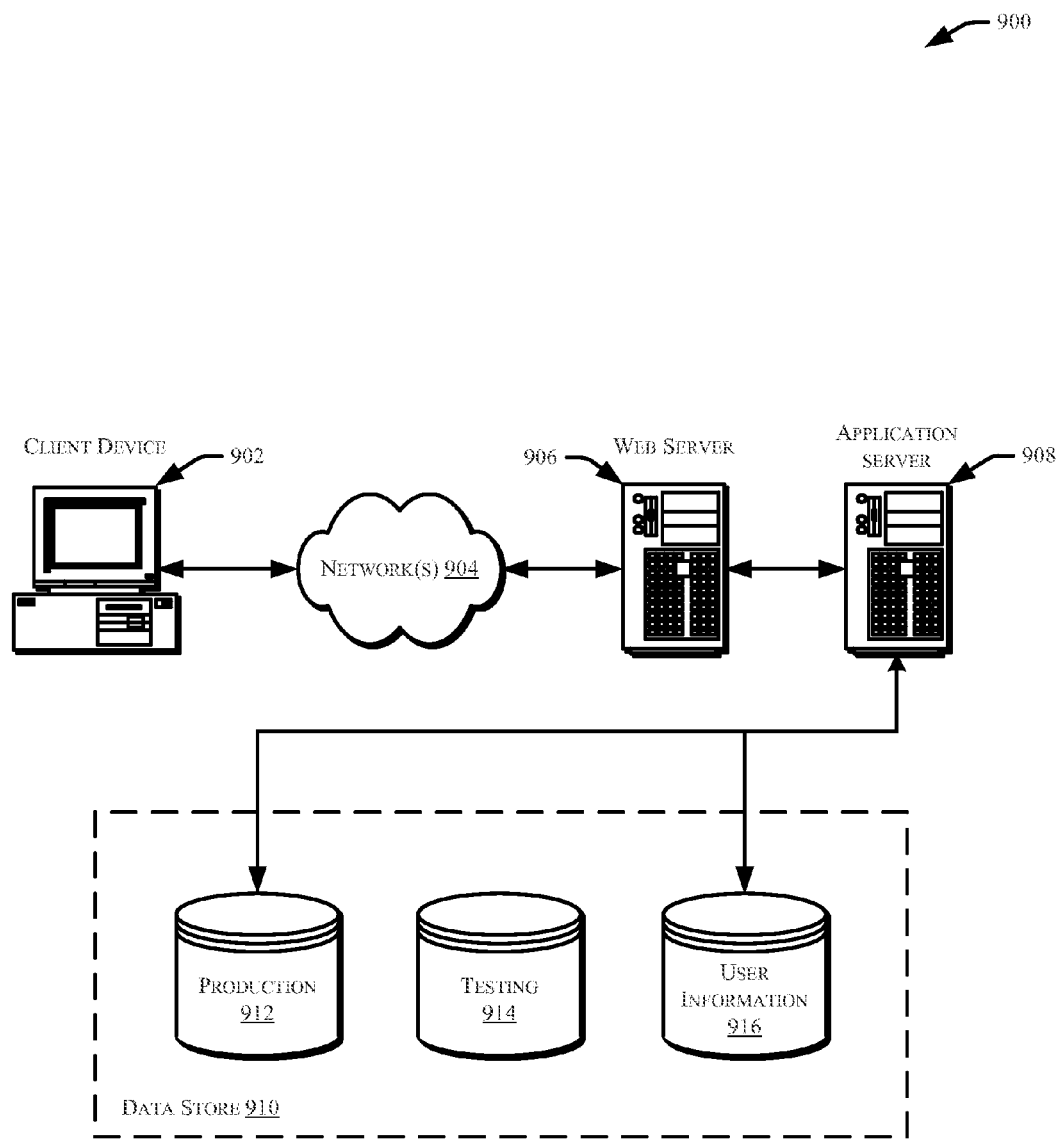
FIG. 9 illustrates an environment in which various embodiments of a spam detection and prevention feature described herein can be implemented, according to at least one example.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
   identifying, by a computing system, that an email client of a user device is attempting to send an electronic message from the computing system to a recipient;
   calculating, by the computing system, a score for the identified electronic message based on a spam detection algorithm and an indication from the user device about the identified electronic message prior to sending the identified electronic message, the score representing a first probability that the identified electronic message contains spam content;
   calculating, by the computing system, a history score for a plurality of electronic messages that the email client of the user device is attempting to send within a time window associated with the identified electronic message, the plurality of electronic messages associated with the identified electronic message, the history score representing a second probability that the plurality of electronic messages also contain the spam content;
   determining, by the computing system, whether the email client of the user device has been compromised by a third party based on the score and the history score; and
   in response to determining that the email client of the user device has been compromised by the third party:
      requesting authentication information from the user device, the authentication information requested from the user device via a communication link other than the compromised email client; and
      preventing, by the computing system, communication of the identified electronic message and the plurality of electronic messages until the user device has been authenticated using the authentication information.

2. The computer-implemented method of claim 1, wherein determining whether the email client of the user device has been compromised comprises comparing the score and the history score to a user specified threshold.

3. The computer-implemented method of claim 1, wherein the spam content includes at least one of content that is irrelevant to a user of the user device, content that contains inappropriate messages, content that contains computer viruses, content that contains links to spam network pages, or content that contains unsolicited advertisements.

4. The computer-implemented method of claim 1, wherein the plurality of messages includes prior messages already sent from the computer system to the recipient on behalf of the email client of the user device and future messages configured to be sent from the computer system to the recipient on behalf of the email client of the user device.

5. A computer-implemented method comprising:
   receiving, by a computing system, an indication that an account of a user device is attempting to send an electronic message from the computing system to a recipient;
   calculating, by the computing system, a score for the electronic message, the score representing a first probability that the electronic message contains spam content;
   determining, by the computing system, whether the account of the user device has been compromised by a third party based on the score for the electronic message and a calculated history score for a plurality of electronic messages that the account is attempting to send within a time window associated with the electronic message, the calculated history score representing a second probability that the plurality of electronic messages also contain the spam content; and
   in response to a determination that the account of the user device has been compromised by the third party, requesting, by the computing system, authentication information from a user of the user device prior to communicating the electronic message to the recipient, the authentication information requested from the user via a communication link other than the compromised account.

6. The computer-implemented method of claim 5, wherein determining whether the account of the user device has been compromised by the third party comprises comparing the score to a threshold, wherein the account of the user device is determined to be compromised by the third party if the score exceeds the threshold.

7. The computer-implemented method of claim 6, wherein the threshold is specified by an administrator of an email service that hosts the account of the user device or by the user.

8. The computer-implemented method of claim 6, wherein the threshold is determined based at least in part on whether an email service that hosts the account of the user device has previously been compromised by the third party.

9. The computer-implemented method of claim 5, wherein an electronic service that hosts the account of the user device includes at least one of an email service, a social networking service, an instant messaging service, or a digital communication service that utilizes electronic messages.

10. A system, comprising:
    a processor; and
    memory including computer-executable instructions that, when executed by the processor, cause the system to at least:
       in response to identifying that an account of a user is attempting to send an electronic message from a messaging service:
          determine whether the messaging service associated with the electronic message is attempting to send unauthorized messages on behalf of the user by:
             calculating a score for the electronic message by analyzing content of the electronic message, and calculating a history score for a plurality of electronic messages that the messaging service is attempting to send within a time window associated with the electronic message, the plurality of electronic messages being associated with the electronic message, the score representing a first probability that the electronic message contains spam content, and the history score representing a second probability that the plurality of electronic messages also contain the spam content; and in response to determining that the messaging service is attempting to send unauthorized messages on behalf of the user based on the calculated score and the calculated history score:
    request authentication information from the user via a communication link other than the messaging service; and
    prevent communication of the electronic message from the messaging service until the user has been authenticated using the authentication information.

11. The system of claim 10, wherein the authentication information includes at least one of a username and password, a unique code, a personal identifier, personal information communicated via a telephone call, or an authenticator token.

12. The system of claim 10, wherein requesting authentication information from the user includes utilizing at least one of a short message service (SMS) message, an email to an alternate email service, a media file, an instant message, or a telephone call.

13. The system of claim 10, wherein the computer-executable instructions further cause the system to at least prevent reset authentication capability of a third party service associated with the messaging service if it is determined that the messaging service is attempting to send the unauthorized messages on behalf of the user.

14. The system of claim 13, wherein preventing reset authentication capability of the third party service includes performing an application programming interface (API) method call provided by the third party service.

15. The system of claim 13, wherein the third party service includes at least one of a banking service, an electronic marketplace service, a credit card service, a financial information service, or a personal information service.

16. A non-transitory computer-readable storage medium collectively storing computer-executable instructions that, when executed by a computer system, configure the computer system to perform operations comprising:
    identifying that a messaging service is attempting to send a plurality of electronic messages;
    determining that the messaging service associated with the plurality of electronic messages is attempting to send unauthorized messages on behalf of a user by:
        calculating a score for an electronic message by analyzing content of the electronic message, and calculating a history score for the plurality of electronic messages based on a determination that the messaging service is attempting to send at least a subset of electronic messages, of the plurality of electronic messages, to a unique recipient within a time threshold;
    in response to determining that the messaging service is attempting to send unauthorized messages on behalf of the user based on the calculated score and the calculated history score:
        request authentication information from the user via a communication link other than the messaging service; and
        prevent communication of the plurality of electronic messages from the messaging service until the user has been authenticated using the authentication information.

17. The non-transitory computer-readable storage medium of claim 16, wherein analyzing the plurality of electronic messages further includes applying a spam detection algorithm to at least the subset of the plurality of electronic messages to determine if the subset of the plurality of electronic messages contains spam content.

18. The non-transitory computer-readable storage medium of claim 16, wherein the operations further comprise:
    receiving one or more notifications from the messaging service associated with the user, the one or more notifications indicating that spam content has been identified by the messaging service;
    determining whether to prevent communication of content from the messaging service based at least in part on the one or more notifications and the time threshold; and
    in response to determining to prevent communication of the content from the messaging service:
        requesting the authentication information from the user; and
        preventing communication of the content from the messaging service until the user has been authenticated using the authentication information.

19. The non-transitory computer-readable storage medium of claim 18, wherein the one or more notifications are implemented by the messaging service utilizing at least one of a tag feature, a flagging feature, or a response submit feature.

20. The non-transitory computer-readable storage medium of claim 16, wherein the operations further comprise:
    in response to the user having been successfully authenticated using the authentication information:
        providing a user interface configured to receive user input, the user input utilized to indicate whether an electronic message has been properly classified as containing spam content; and
        sending electronic messages in response to the user input indicating that the electronic messages do not contain spam content.

\* \* \* \* \*